(12) United States Patent
Khosla

(10) Patent No.: US 10,257,643 B2
(45) Date of Patent: Apr. 9, 2019

(54) EVENT PREDICTION THROUGH MONITORING A MOBILE DEVICE

(76) Inventor: Vinod Khosla, Portola Valley, CA (US)

( * ) Notice: Subject to any disclaimer, the term of this patent is extended or adjusted under 35 U.S.C. 154(b) by 486 days.

(21) Appl. No.: 13/584,854

(22) Filed: Aug. 14, 2012

(65) Prior Publication Data

US 2014/0051458 A1 Feb. 20, 2014

(51) Int. Cl.
| | |
|---|---|
| *H04W 4/021* | (2018.01) |
| *H04W 4/029* | (2018.01) |
| *H04W 4/02* | (2018.01) |
| *H04W 64/00* | (2009.01) |

(52) U.S. Cl.
CPC .............. *H04W 4/021* (2013.01); *H04W 4/02* (2013.01); *H04W 4/029* (2018.02); *H04W 64/003* (2013.01)

(58) Field of Classification Search
CPC ......... H04L 67/16; H04L 67/26; H04L 67/06; H04L 67/306; H04L 43/08; H04L 43/10; H04L 41/0886; H04L 51/14; H04W 4/008; H04W 4/023; H04W 24/04; H04W 4/025; H04W 4/028; H04W 52/0209; H04W 64/00; H04W 64/003; H04W 64/006; H04W 88/02; H04W 4/02; H04W 24/08; H04W 24/00; H04W 4/003; H04W 4/12; G06F 3/04842
USPC ........................................... 455/456.1–456.3
See application file for complete search history.

(56) References Cited

U.S. PATENT DOCUMENTS

| | | | |
|---|---|---|---|
| 6,400,996 | B1 | 6/2002 | Hoffberg et al. |
| 6,640,145 | B2 | 10/2003 | Hoffberg et al. |
| 7,613,773 | B2 | 11/2009 | Watt |
| 7,813,954 | B1 | 10/2010 | Price et al. |
| 2002/0151992 | A1 | 10/2002 | Hoffberg et al. |
| 2004/0221323 | A1 | 11/2004 | Watt |
| 2006/0046719 | A1* | 3/2006 | Holtschneider ............... 455/434 |

(Continued)

FOREIGN PATENT DOCUMENTS

WO    WO-2010102069 A2    9/2010

OTHER PUBLICATIONS

Co-pending U.S. Appl. No. 14/755,237, filed Jun. 30, 2015.

(Continued)

*Primary Examiner* — Christopher M Brandt
*Assistant Examiner* — Jing Gao
(74) *Attorney, Agent, or Firm* — Wilson Sonsini Goodrich & Rosati

(57) ABSTRACT

A method includes monitoring a geospatial location of a user of a mobile device having a processor communicatively coupled to a memory through the mobile device, date stamping and time stamping the geospatial location of the user through the mobile device, and monitoring, through a server having another processor communicatively coupled to another memory and/or the mobile device, an interaction of the user with the mobile device and/or a device communicatively coupled to the server based on the geospatial location of the user. The method also includes predicting, through the server and/or the mobile device, an event related to the mobile device and/or the device based on the monitoring of the interaction of the user therewith, and enabling, through the server and/or the mobile device, automatic performance of an action on the mobile device and/or the device on behalf of the user in accordance with the prediction of the event.

48 Claims, 9 Drawing Sheets

(56) References Cited

U.S. PATENT DOCUMENTS

| | | | |
|---|---|---|---|
| 2009/0163196 A1* | 6/2009 | Van Steenbergen | 455/422.1 |
| 2009/0313015 A1 | 12/2009 | Basson et al. | |
| 2011/0057790 A1* | 3/2011 | Martin | G06Q 10/109 |
| | | | 340/539.13 |
| 2011/0098031 A1* | 4/2011 | Dakshayani | H04W 60/00 |
| | | | 455/422.1 |
| 2011/0162018 A1 | 6/2011 | Dodd | |
| 2011/0167136 A1 | 7/2011 | Naimark et al. | |
| 2011/0167468 A1 | 7/2011 | Lee et al. | |
| 2011/0225608 A1 | 9/2011 | Lopatecki et al. | |
| 2011/0273114 A1* | 11/2011 | Ogg | H05B 37/029 |
| | | | 315/312 |
| 2011/0275388 A1 | 11/2011 | Haney | |
| 2012/0093141 A1* | 4/2012 | Imes | F24F 11/006 |
| | | | 370/338 |
| 2012/0317615 A1* | 12/2012 | Geva | G06F 21/31 |
| | | | 726/3 |
| 2013/0030600 A1* | 1/2013 | Shetty | F24F 11/006 |
| | | | 700/300 |
| 2013/0166073 A1* | 6/2013 | Pine | F24F 11/0034 |
| | | | 700/276 |
| 2014/0013100 A1* | 1/2014 | Menzel et al. | 713/150 |
| 2015/0304812 A1 | 10/2015 | Khosla | |

OTHER PUBLICATIONS

Office action dated Mar. 11, 2016 for U.S. Appl. No. 14/755,237.
Office Action dated Jun. 2, 2017 for U.S. Appl. No. 14/755,237.
Office Action dated Jul. 15, 2016 for U.S. Appl. No. 14/755,237.
Office Action dated Sep. 8, 2016 for U.S. Appl. No. 14/755,237.
U.S. Appl. No. 14/755,237 Office Action dated Jan. 11, 2018.
U.S. Appl. No. 14/755,237 Office Action dated Jun. 21, 2018.

* cited by examiner

EVENT PREDICTION THROUGH MONITORING A MOBILE DEVICE

FIELD OF TECHNOLOGY

This disclosure relates generally to mobile devices and, more particularly, to a method, an apparatus and/or a system of event prediction through monitoring a mobile device.

BACKGROUND

An individual possessing a mobile device (e.g., a mobile phone) may exhibit an identifiable pattern of behavior. For example, the individual may access the Internet through the mobile device. In addition, the individual may maintain a record of activities through the mobile device. Further, the individual may frequently access external devices such as a computer, a projector, a media player etc. and/or may contact users of other mobile devices. The individual may expend considerable amounts of physical energy and/or mental energy in controlling factors necessary to successfully complete a task (e.g., adjusting a setting such as temperature, communicating status information to another mobile device) on a recurring (e.g., daily, weekly, monthly) basis. The aforementioned factors may require manual control on behalf of the user, which is subject to detrimental factors such as fatigue, stress and/or lack of time, leading to a less-than-optimal adjustment thereof.

SUMMARY

A method, an apparatus and/or system of event prediction through monitoring a mobile device are disclosed.

In one aspect, a method includes monitoring a geospatial location of a user of a mobile device having a processor communicatively coupled to a memory through the mobile device, date stamping and time stamping the geospatial location of the user through the mobile device, and monitoring, through a server having another processor communicatively coupled to another memory and/or the mobile device, an interaction of the user with the mobile device and/or a device communicatively coupled to the server based on the geospatial location of the user. The method also includes predicting, through the server and/or the mobile device, an event related to the mobile device and/or the device based on the monitoring of the interaction of the user therewith, and enabling, through the server and/or the mobile device, automatic performance of an action on the mobile device and/or the device on behalf of the user in accordance with the prediction of the event. The event is in a temporal future relative to the prediction.

In another aspect, a system includes a computer network, a mobile device communicatively coupled to the computer network, and another device communicatively coupled to the computer network. The mobile device includes a processor communicatively coupled to a memory. The processor of the mobile device is configured to execute instructions for receiving a geospatial location of a user of the mobile device, date stamping and time stamping the geospatial location of the user, monitoring an interaction of the user with the mobile device and/or the another device communicatively coupled to the computer network based on the geospatial location of the user, predicting an event related to the mobile device and/or the another device based on the monitoring of the interaction of the user therewith, and enabling automatic performance of an action on the mobile device and/or the another device on behalf of the user in accordance with the prediction of the event. The event is in a temporal future relative to the prediction.

In yet another aspect, a system includes a computer network, a mobile device communicatively coupled to the computer network, another device communicatively coupled to the computer network, and a server communicatively coupled to the mobile device and the another device through the computer network. The server includes a processor communicatively coupled to a memory, with the processor being configured to execute instructions for receiving a date-stamped and time-stamped geospatial location of a user of the mobile device, monitoring an interaction of the user with the mobile device and/or the another device communicatively coupled to the computer network based on the geospatial location of the user, predicting an event related to the mobile device and/or the another device based on the monitoring of the interaction of the user therewith, and enabling automatic performance of an action on the mobile device and/or the another device on behalf of the user in accordance with the prediction of the event. The event is in a temporal future relative to the prediction.

The methods and systems disclosed herein may be implemented in any means for achieving various aspects, and may be executed in a form of a machine-readable medium embodying a set of instructions that, when executed by a machine, cause the machine to perform any of the operations disclosed herein.

Other features will be apparent from the accompanying drawings and from the detailed description that follows.

DESCRIPTION OF THE DIAGRAMS

Example embodiments are illustrated by way of example and not limitation in the figures of the accompanying drawings, in which like references indicate similar elements and in which.

Other features of the present embodiments will be apparent from the accompanying drawings and from the disclosure of the various embodiments.

DETAILED DESCRIPTION

A method, an apparatus and/or a system of event prediction through monitoring a mobile device are disclosed. In the following description, for the purpose of explanation, numerous specific details are set forth in order to provide a thorough understanding of the various embodiments. It will be evident, however, to one skilled in the art, that the various embodiments may be practiced without these specific details.

Figure 1:
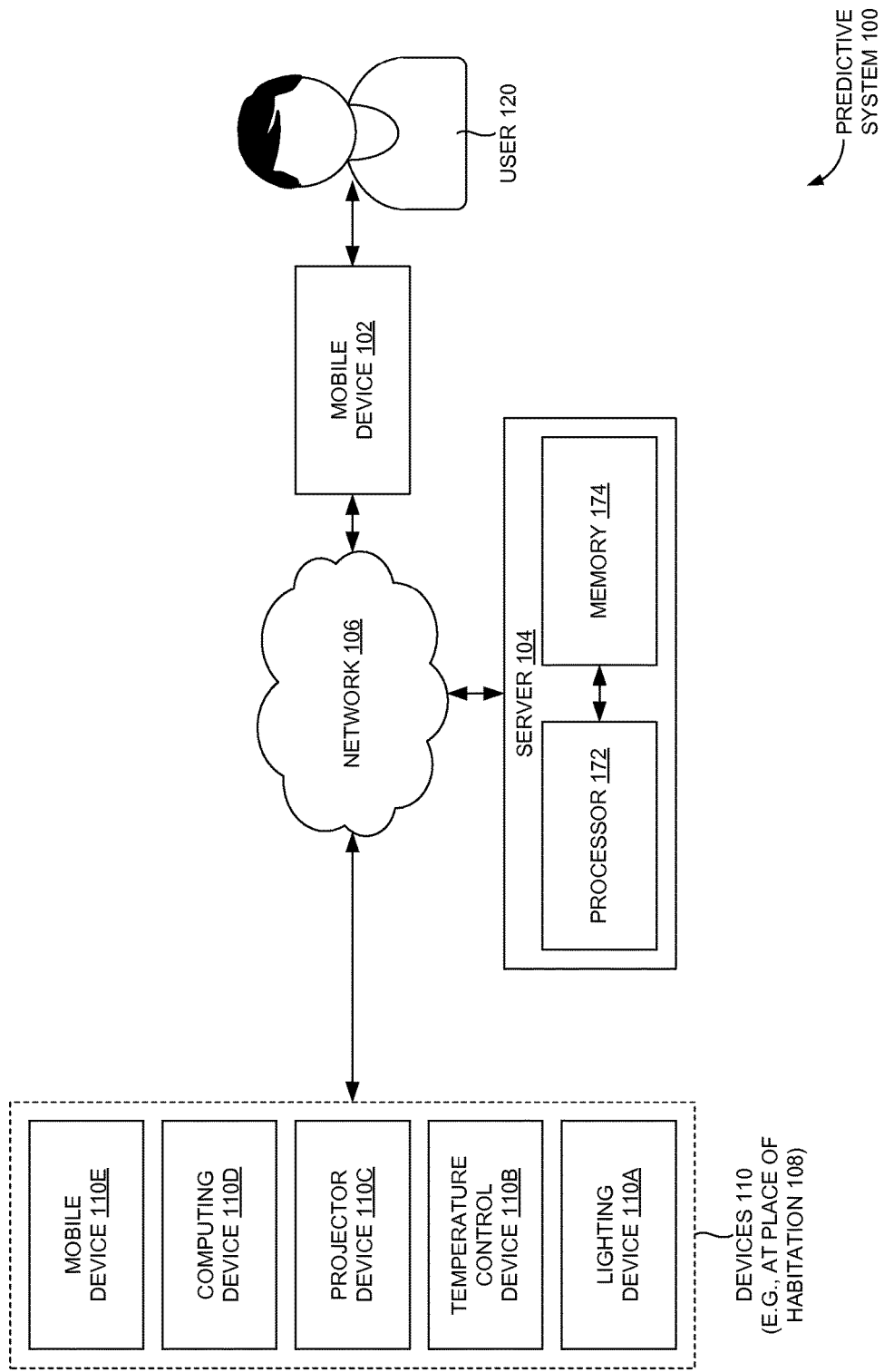
FIG. 1 is a schematic view of a predictive system, according to one or more embodiments.

FIG. 1 shows a predictive system 100, according to one or more embodiments. In one or more embodiments, predictive system 100 may include a mobile device 102 (e.g., a mobile phone, a Personal Digital Assistant (PDA), a tablet computing device, a watch, a Global Positioning System (GPS) device) configured to communicate with a server 104 through a computer network (e.g., network 106). In one or more embodiments, server 104 may also be communicatively coupled to one or more devices 110 (e.g., lighting device 110A, temperature control device 110B, projector device 110C, computing device 110D, mobile device 110E) at a place of habitation 108 (e.g., place of residence, office, gymnasium) through network 106. While an example set of five devices are shown at place of habitation 108, it is obvious that place of habitation 108 may include merely one device, less than five devices or more than five devices. In one or more embodiments, place of habitation 108 may be associated with a user 120 of mobile device 102 and/or a user of mobile device 110E (to be discussed later).

In one or more embodiments, predictive system 100 may enable mobile device 102 to control, access and/or predictively adjust devices 110. In one or more embodiments, server 104 may be a data processing device having a processor 172 (e.g., a Central Processing Unit (CPU)) communicatively coupled to a memory 174 (e.g., a Random Access Memory (RAM), a Read-Only Memory (ROM)) executing a set of instructions (e.g., a computer program) therefor. In one or more embodiments, network 106 may be the Internet or a Wide Area Network (WAN), a Storage Area Network (SAN), a Local Area Network (LAN), a Wi-Fi™ based network, a Bluetooth® based network etc. Other examples of place of habitation 108 may be a conference room or a car. Any enclosure providing user 120 (e.g., as shown in FIG. 2) and/or the another user (e.g., a user of mobile device 110E) space to perform tasks on devices 110 may be construed as place of habitation 108.

In one or more embodiments, mobile device 102 may periodically communicate a geospatial location thereof (to be discussed with regard to FIG. 2) and/or an interaction of user 120 therewith to server 104. In one or more embodiments, devices 110 may also be configured to periodically communicate interaction(s) of user 120 therewith to server 104.

Figure 2:
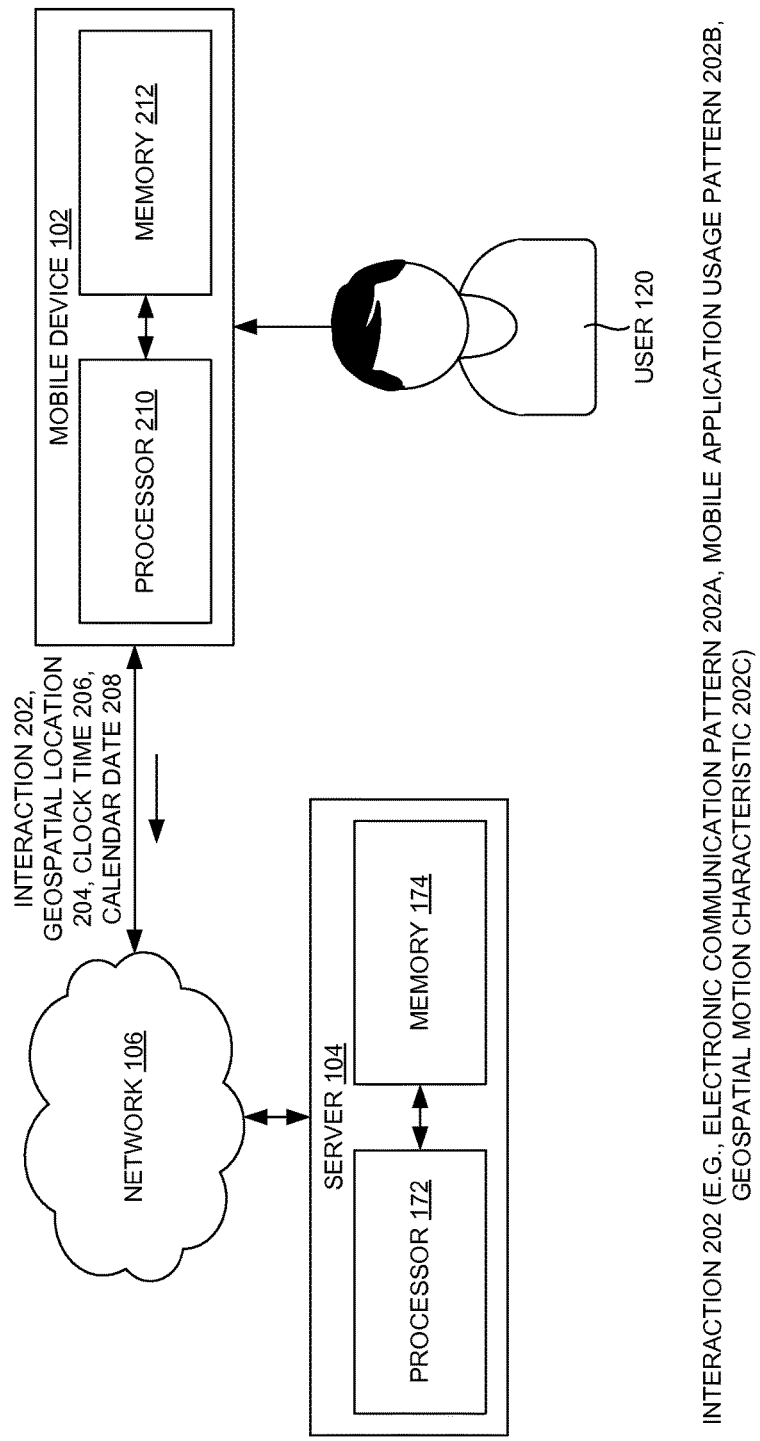
FIG. 2 is a schematic view of an interaction of a user of a mobile device in the predictive system of FIG. 1 with the mobile device.

FIG. 2 shows interaction 202 of user 120 with mobile device 102, according to one or more embodiments. Interaction 202 may be an operation performed by user 120 on mobile device 102. Examples of interaction 202 of user 120 with mobile device 102, as shown in FIG. 2, may include an electronic communication pattern 202A, a mobile application usage pattern 202B and a geospatial motion characteristic 202C (e.g., physical location coordinates of user 120). Other examples are within the scope of the exemplary embodiments discussed herein. As shown in FIG. 2, mobile device 102 may also include a processor 210 communicatively coupled to a memory 212 (e.g., a flash memory, a Dynamic RAM (DRAM), a Static RAM (SRAM)) thereof. Mobile device 102 may execute applications (e.g., through processor 210) to generate a geospatial location thereof and/or a date/time. The aforementioned execution may generate geospatial location 204 of mobile device 102, clock time 206 and calendar date 208. Geospatial location 204 may obviously be a function of clock time 206 and calendar date 208, as geospatial location 204 may vary with clock time 206 and calendar date 208. The aforementioned results of execution may be communicated from mobile device 102 to server 104.

Examples of user 120 include but are not limited to an event organizer, a meeting planner, and a building keeper. User 120 may interact with mobile device 102 to make conference calls therethrough, create events utilizing a calendar thereon, enter a destination thereon etc. Geospatial location 204 may be the spatial coordinates associated with place of habitation 108 (and/or location of user 120), clock time 206 may indicate a time at which user 120/mobile device 102 is at geospatial location 204, and calendar date 208 may indicate a date at which user 120/mobile device 102 is at geospatial location 204. Thus, interaction 202 may be associated with geospatial location 204, clock time 206 and calendar date 208, thereby being time-stamped, date-stamped and location-stamped therewith.

Memory 212 of mobile device 102 may store information such as interaction 202 and geospatial location 204 therein. As shown in FIG. 2, server 104 may monitor interaction 202 of user 120 with mobile device 102. In an example embodiment, server 104 may periodically monitor interaction 202 as a function of geospatial location 204, clock time 206 and calendar date 208. Mobile device 102 may periodically communicate the aforementioned geospatial location 204 and interaction 202 as the function of geospatial location 204, clock time 206 and calendar date 208 to server 104 through network 106 based on instruction execution through processor 210. In one or more embodiments, server 104 (e.g., by executing a set of instructions through processor 172; the set of instructions may be stored in memory 174) may analyze data transmitted thereto to determine interaction 202 to be electronic communication pattern 202A, mobile application usage pattern 202B and/or geo spatial motion characteristic 202C.

Figure 3:
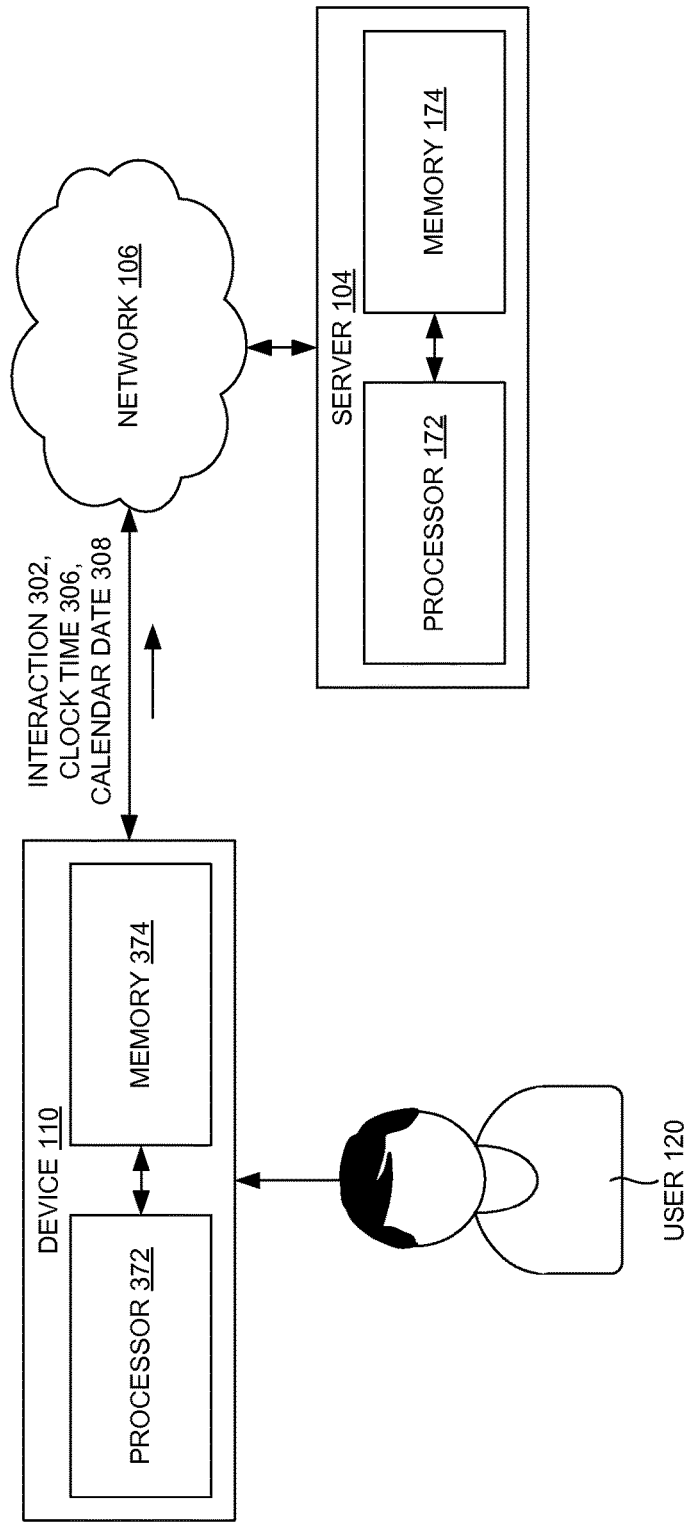
FIG. 3 is a schematic view of an interaction of the user of the mobile device with other devices at a place of habitation of the predictive system of FIG. 1.

FIG. 3 shows interaction 302 of user 120 with devices 110 in place of habitation 108, according to one or more embodiments. As seen in FIG. 3, each of devices 110 may also include a processor 372 communicatively coupled to a memory 374. Again, in one or more embodiments, interaction 302 may be an action that user 120 performs on one or more of devices 110. Example actions with additional reference to FIG. 1 may include turning on a light (related to lighting device 110A), adjusting temperature (related to temperature control device 110B) and setting up projector device 110C in place of habitation 108. Application(s) executing on each of devices 110 may generate a clock time 306 and a calendar date 308, analogous to mobile device 102. Clock time 306 and calendar date 308 together may indicate the date and time of user 120 being at place of habitation 108. As shown in FIG. 3, devices 110 may communicate (e.g., periodically) interaction 302 as a function of clock time 306 and calendar date 308 to server 104, where the aforementioned communicated information may be analyzed and data associated with the behavioral pattern(s) of user 120 generated.

Figure 4:
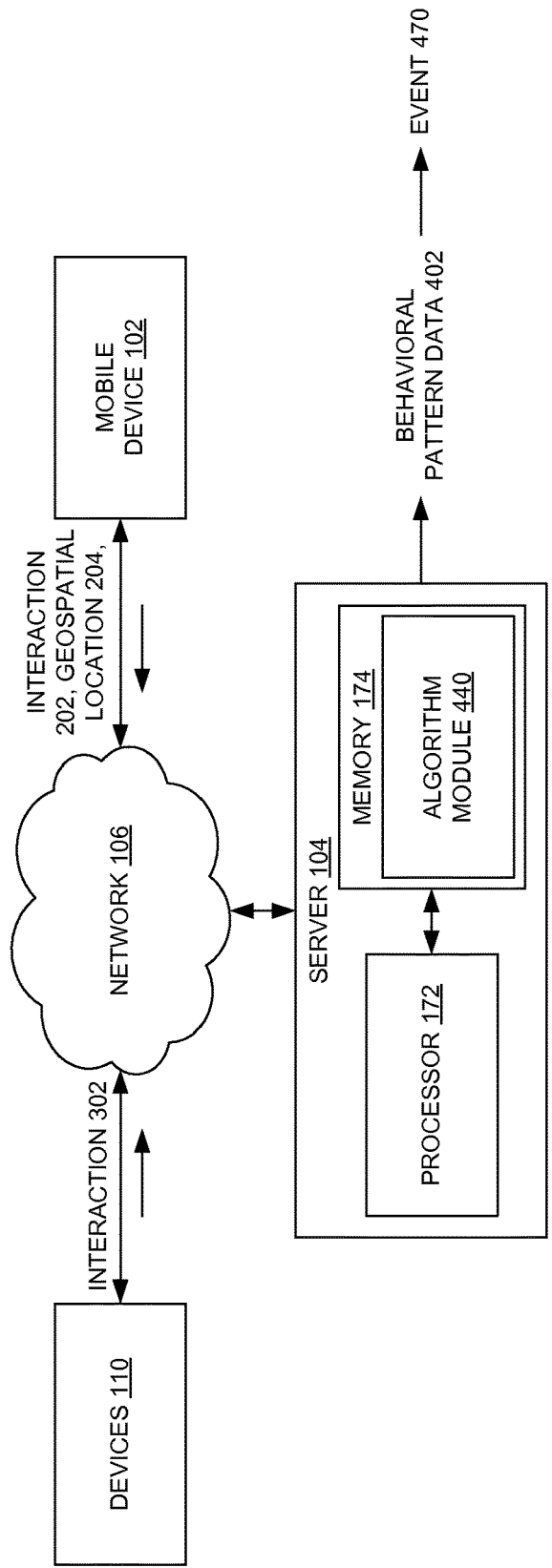
FIG. 4 is a schematic view of the mobile device and the other devices of the predictive system of FIG. 1 communicating information to a server.

FIG. 4 shows mobile device 102 and devices 110 communicating geospatial location 204, interaction 202 and interaction 302 through network 106 to server 104. As shown in FIG. 4, server 104 may execute an algorithm module 440 through processor 172, algorithm module 440 including instructions to analyze geospatial location 204 and interaction 202 to generate behavioral pattern data 402 of user 120. Based on interaction 302, server 104 may also be configured to adjust behavioral pattern data 402 (to be discussed below). In one or more embodiments, memory 174 may have instructions associated with algorithm module 440 stored therein. Algorithm module 440 may statistically analyze data (e.g., a record of activities of user 120 including geospatial location 204, interaction 202 and interaction 302) from devices 110 and/or mobile device 102 to generate behavioral pattern data 402. In one or more embodiments, behavioral pattern data 402 may predict future activities of user 120.

With regard to FIG. 4, algorithm module 440 may generate behavioral pattern data 402 based on geospatial location 204 and interaction 202 as a function of clock time 206 and calendar date 208. In one or more embodiments, server 104 (e.g., through algorithm module 440) may adjust behavioral pattern data 402 based on the periodic communication of interaction 302 as a function of clock time 306 and calendar date 308.

In one or more embodiments, server 104 may probabilistically predict an event (e.g., event 470) associated with user 120 based on behavioral pattern data 402. In an example embodiment, algorithm module 440 executing on server 104 may calculate a probability of a previous event reoccurring in a temporal window of time. For example, event 470 predicted may include an environmental control action 502A (e.g., a lighting adjustment, a temperature adjustment, a setting adjustment, and an accessibility adjustment shown in FIG. 5) and/or a state change action 502B (a device power setting, a power activation procedure, a power discharge procedure, a schedule notification, an alert notification, an arrival notification, a departure notification, a state adjustment, and a motion adjustment shown in FIG. 5).

Figure 5:
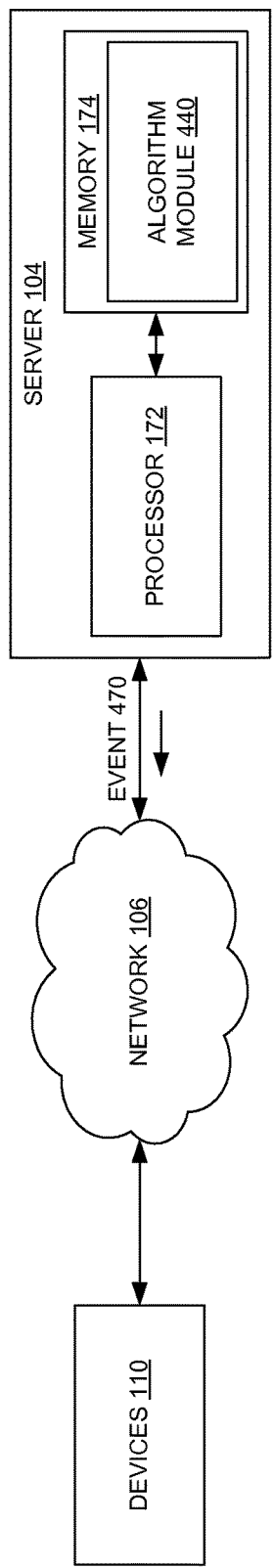
FIG. 5 is a schematic view of an event being communicated to the other devices as a result of analysis through an algorithm module of the server in the predictive system of FIG. 1.

FIG. 5 shows event 470 being communicated to devices 110 through network 106 as the result of analysis through algorithm module 440 based on behavioral pattern data 402. The predicted temporal window of time during which event 470 is likely to occur may be related to the periodic communication of geospatial location 204 and interaction 202 as function(s) of clock time 206 and calendar date 208. In one or more embodiments, server 104 may communicate event 470 as a recommended action required on devices 110 on behalf of user 120. In an example scenario, user 120 may utilize a conference room (an example place of habitation 108) during 9:00 am to 10:00 am on every Monday to make presentations on a projector device therein. Based on the coupling between the projector device and server 104, the projector device may be automatically transitioned into an active mode of operation thereof (and/or adjustments performed thereon) during 9:00 am-10:00 am every Monday. Additionally, user 120 may prefer a particular temperature setting on a thermostat in the conference room. Server 104 may once again automatically adjust the temperature setting to a preferred temperature of user 120.

Figure 6:
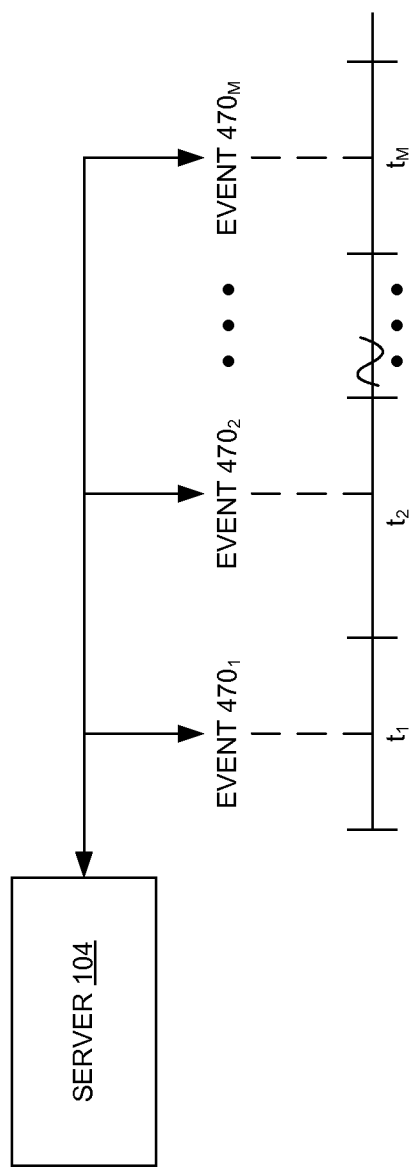
FIG. 6 is a schematic view of a number of events predicted at respective temporal windows of time through the predictive system of FIG. 1.

FIG. 6 shows a number of events $470_{1-M}$ predicted at respective temporal windows of time (e.g., $470_1$ at $t_1$ $610_1$, $470_2$ at $t_2$ $610_2$ to $470_M$ at $t_M$ $610_M$). It is obvious that the aforementioned temporal windows of time are in a temporal future with respect to analysis (e.g., clock time 206 of mobile device 102) being performed through algorithm module 440. Events $470_{1-M}$ may be future activities and/or events predicted to occur in the aforementioned temporal windows of time. For example, a temporal window of time may be 10 minutes after a current time and may last for 15 minutes, 1 hour or 1 day. Any temporal window of time in a temporal future with respect to analysis through algorithm module 440 is within the scope of the exemplary embodiments discussed herein.

Figure 7:
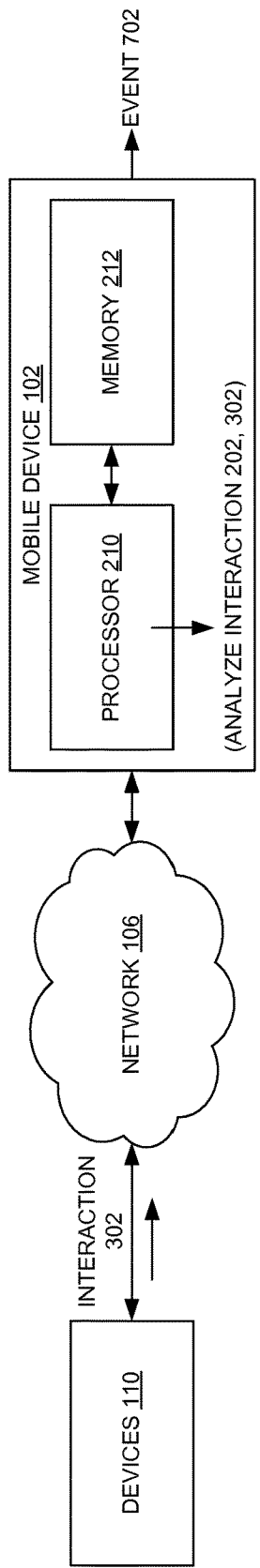
FIG. 7 is a schematic view of prediction through the mobile device instead of the server in the predictive system of FIG. 1.
Figure 8:
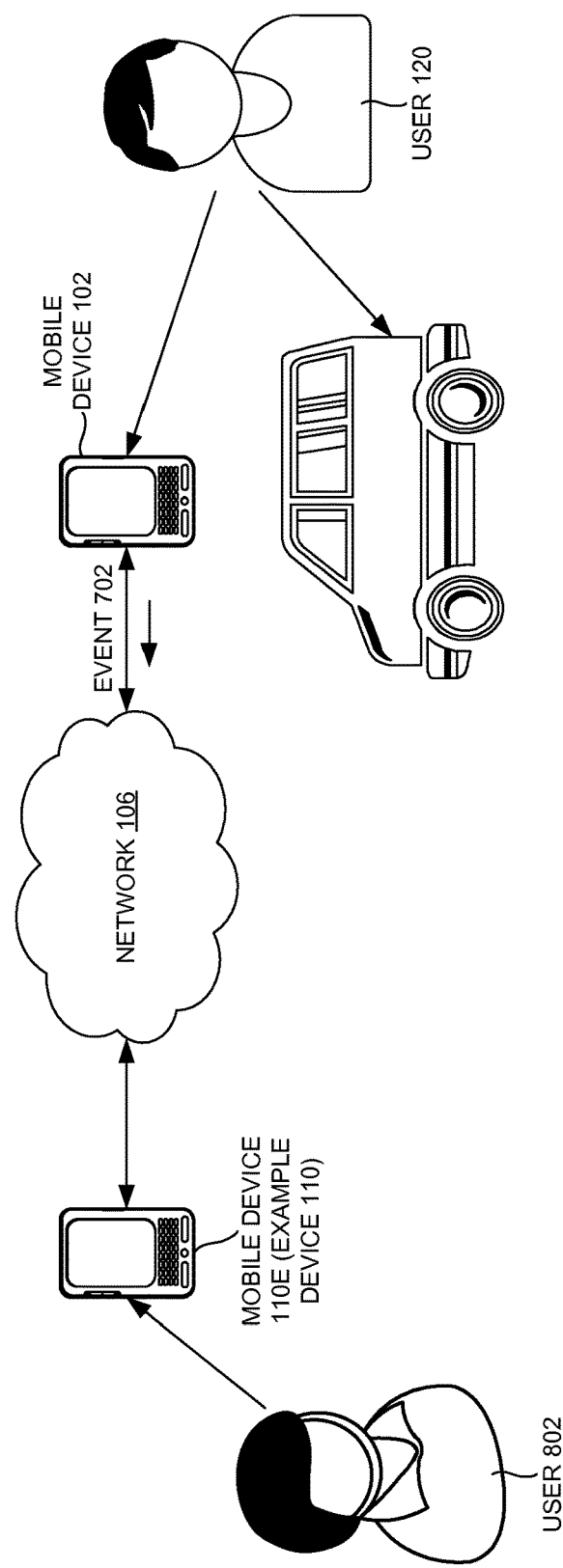
FIG. 8 is an illustrative view of an example scenario of prediction through the mobile device of FIG. 1.

Although exemplary embodiments discussed above utilize server 104 to predict events $470_{1-M}$, one or more of the aforementioned events $470_{1-M}$ may also be predicted at mobile device 102 (e.g., through processor 210 executing instructions associated with an analogous algorithm module 440 stored in memory 212). FIG. 7 shows mobile device 102 predicting an event (e.g., event 702 analogous to events $470_{1-M}$) instead of server 104. FIG. 8 shows an example scenario of mobile device 102 predicting event 702. Here, device 110 may be mobile device 110E associated with a family member/friend/acquaintance of user 120 (e.g., user 802). User 120 may be required to drive a car from a place of residence thereof to a place of residence of user 802 for a 2 pm meeting with user 802. User 120 may be late for the meeting due to unforeseen events. By analysis of geospatial coordinates (e.g., geospatial location 204; here, user 120 may still be at the place of residence thereof, or, somewhere nearby) thereof through processor 210, mobile device 102 may automatically transmit event 702 to mobile device 110E indicating that user 120 would be late for the meeting (an example status information) on behalf of user 120.

Further, mobile device 102 may calculate an approximate time of arrival at the place of residence (an example place of habitation 108) of user 802 and automatically transmit the same to mobile device 110E. Based on periodic analysis of geospatial location 204, mobile device 120 may automatically transmit updated expected time(s) of arrival. It is obvious that the aforementioned analysis may be performed at server 104 instead of mobile device 210 as discussed with regard to other figures. Further, all other example scenarios involving analysis through mobile device 210 and/or server 104 are within the scope of the exemplary embodiments discussed herein.

Additionally, it should be noted that while algorithm module 440 is shown as executing a set of instructions associated with analysis and prediction in the figures, algorithm module 440 may execute a single algorithm or a number of algorithms involved in the aforementioned analysis or prediction. Further, server 104 may be a single server or a number of servers networked together to function in an appropriate manner. Still further, server 104 may also be interpreted to include cloud-based virtual computing platforms. Also, server 104 may time-stamp and date-stamp geospatial location 204 of user 120 instead of mobile device 102.

In the example embodiments of FIG. 8 and relevant figures including mobile device 102, mobile device 102 may also prompt user 102 to collect data associated therewith and/or analyze the aforementioned data for prediction purposes. For example, user 102 may be given a capability to postpone, disable and/or skip analysis and prediction through mobile device 102 and/or server 104. In an example embodiment where the aforementioned analysis and prediction is offered as a service (here server 104 may be involved in the analysis and prediction), user 102 may be monitored during the period of subscription. He/she may be required to skip the analysis/prediction through directly communicating with the service provider therefor.

Figure 9:
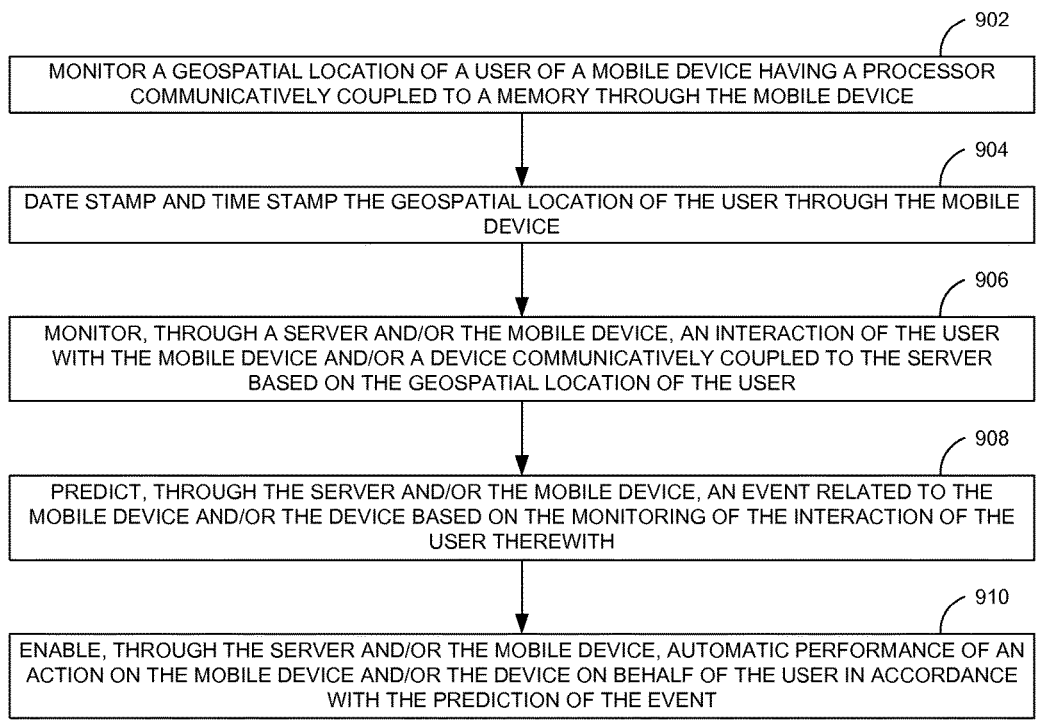
FIG. 9 is a process flow diagram detailing the operations involved in a method of predicting an event associated with the mobile device and/or the devices of the predictive system of FIG. 1, according to one or more embodiments.

FIG. 9 shows a process flow diagram detailing the operations involved in a method of predicting an event associated with mobile device 102 and/or devices 110, according to one or more embodiments. In one or more embodiments, operation 902 may monitoring geospatial location 204 of user 120 of mobile device 102 having processor 210 communicatively coupled to memory 212 through mobile device 102. In one or more embodiments, operation 904 may involve date stamping and time stamping geospatial location 204 of user 102 through mobile device 102. In one or more embodiments, operation 906 may involve monitoring, through server 104 having another processor 172 communicatively coupled to another memory 174 and/or mobile device 102, an interaction (e.g., interaction 202, interaction 302) of user 120 with mobile device 102 and/or device 110 communicatively coupled to server 104 based on geospatial location of the user 204.

In one or more embodiments, operation 908 may involve predicting, through server 104 and/or mobile device 102, event 470 related to mobile device 102 and/or device 110 based on the monitoring of the interaction of user 120 therewith. In one or more embodiments, event 470 may be in a temporal future relative to the prediction. In one or more embodiments, operation 910 may involve enabling, through server 104 and/or mobile device 102, automatic performance of an action on mobile device 102 and/or device 110 on behalf of user 120 in accordance with the prediction of event 470.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software (e.g., embodied in a machine readable medium) etc.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
   monitoring a geospatial location of a user of a mobile device having a processor communicatively coupled to a memory through the mobile device;
   date-stamping and time-stamping the geospatial location of the user through the mobile device;
   monitoring, through at least one of a server having another processor communicatively coupled to another memory, the mobile device, and another device communicatively coupled to the mobile device, an interaction of the user with the mobile device based on the geospatial location of the user; and monitoring a control of the another device, wherein the control is by the user of the mobile device, wherein the control is via a mobile application of the mobile device that controls the another device, and wherein the monitoring of the control of the another device is based on the geospatial location of the user;
   calculating a probability, through the at least one of the server, the mobile device, and the another device communicatively coupled to the mobile device based on the monitoring of the interaction of the user with the mobile device based on the geospatial location of the user; and based on the monitoring of the control of the another device, of an occurrence of an event related to the mobile device and the another device, the event being in a temporal future relative to the calculating of the probability; and
   performing, through the at least one of the server and the mobile device, an action on the another device on behalf of the user in accordance with the calculated probability of the occurrence of the event before the user arrives at a place of habitation, wherein the another device is located at the place of habitation.

2. The method of claim 1, wherein one of: the user is at a place of location of the mobile device, and the another device is associated with another user.

3. The method of claim 2, further comprising transmitting, through the another device, the interaction of the user with the mobile device.

4. The method of claim 1, further comprising analyzing, through the at least one of the server and the mobile device, data associated with the monitoring of the interaction of the user with the mobile device and the monitoring of the control of the another device to generate a behavioral pattern data of the user; and calculating the probability of the occurrence of the event based on the behavioral pattern data generated.

5. The method of claim 1, further comprising periodically transmitting the geospatial location of the user to the server.

6. The method of claim 1, further comprising adjusting data associated with the event based on periodic monitoring of the time-stamped and the date-stamped geospatial location of the user through the at least one of the server and the mobile device.

7. The method of claim 1, further comprising adjusting the calculated probability based on periodic monitoring of the interaction of the user with the mobile device.

8. The method of claim 1, further comprising monitoring a geospatial motion of the user of the mobile device.

9. The method of claim 1, wherein the another device is not a mobile device.

10. The method of claim 1, wherein the action is an environmental control action.

11. The method of claim 1, wherein the action is a state change action.

12. The method of claim 1, wherein the action is completing a task.

13. The method of claim 1, wherein the action is a device power setting, a power activation procedure, a power discharge procedure, a schedule notification, an alert notification, an arrival notification, a departure notification, a state adjustment, or a motion adjustment.

14. The method of claim 1, wherein the another device is a lighting device, a projector device, or a computing device.

15. The method of claim 1, wherein the place of habitation is a place of residence, an office, a gymnasium, a conference room, or a car.

16. The method of claim 1, wherein the place of habitation is not a place of residence.

17. The method of claim 1, wherein the performing of the action on the another device on behalf of the user in accordance with the calculated probability of the occurrence of the event is at least 10 minutes before the user arrives at the place of habitation.

18. A system comprising:
   a computer network;
   a mobile device communicatively coupled to the computer network, the mobile device comprising a processor communicatively coupled to a memory; and another device communicatively coupled to the computer network, wherein the processor of the mobile device is configured to execute instructions for:

receiving a geospatial location of a user of the mobile device, date-stamping and time-stamping the geospatial location of the user;

monitoring an interaction of the user with the mobile device based on the geospatial location of the user; and monitoring a control of the another device, wherein the control is by the user of the mobile device, wherein the control is via a mobile application of the mobile device that controls the another device, and wherein the monitoring of the control of the another device is based on the geospatial location of the user;

calculating a probability, based on the monitoring of the interaction of the user with the mobile device based on the geospatial location of the user; and based on the monitoring of the control of the another device, of an occurrence of an event related to the mobile device and the another device, the event being in a temporal future relative to the calculating of the probability; and performing an action on the another device on behalf of the user in accordance with the calculated probability of the occurrence of the event before the user arrives at a place of habitation, wherein the another device is located at the place of habitation.

19. The system of claim 18, wherein the another device is configured to transmit an interaction of the user therewith to the mobile device to enable analysis thereof through the mobile device.

20. The system of claim 18, wherein the processor of the mobile device is further configured to execute instructions for analyzing data associated with the monitoring of the interaction of the user with the mobile device and the monitoring of the control of the another device to generate a behavioral pattern data of the user; and calculating the probability of the occurrence of the event based on the behavioral pattern data generated.

21. The system of claim 18, wherein the processor of the mobile device is further configured to execute instructions for adjusting data associated with the event based on periodic reception of the geospatial location of the user.

22. The system of claim 18, wherein the mobile device is further configured to execute instructions for adjusting the calculated probability based on periodic monitoring of the interaction of the user with the mobile device.

23. The system of claim 18, wherein the mobile device is further configured to execute instructions for receiving a geospatial motion of the user of the mobile device.

24. The system of claim 18, wherein the another device is not a mobile device.

25. The system of claim 18, wherein the action is an environmental control action.

26. The system of claim 18, wherein the action is a state change action.

27. The system of claim 18, wherein the action is completing a task.

28. The system of claim 18, wherein the action is a device power setting, a power activation procedure, a power discharge procedure, a schedule notification, an alert notification, an arrival notification, a departure notification, a state adjustment, or a motion adjustment.

29. The system of claim 18, wherein the another device is a lighting device, a projector device, or a computing device.

30. The system of claim 18, wherein the place of habitation is a place of residence, an office, a gymnasium, a conference room, or a car.

31. The system of claim 18, wherein the place of habitation is not a place of residence.

32. The system of claim 18, wherein the performing of the action on the another device on behalf of the user in accordance with the calculated probability of the occurrence of the event is at least 10 minutes before the user arrives at the place of habitation.

33. A system comprising:
a computer network;
a mobile device communicatively coupled to the computer network;
another device communicatively coupled to the computer network; and
a server communicatively coupled to the mobile device and the another device through the computer network, the server comprising a processor communicatively coupled to a memory, and the processor being configured to execute instructions for:

receiving a date-stamped and time-stamped geospatial location of a user of the mobile device;

monitoring an interaction of the user with the mobile device based on the geospatial location of the user; and monitoring a control of the another device, wherein the control is by the user of the mobile device, wherein the control is via a mobile application of the mobile device that controls the another device, and wherein the monitoring of the control of the another device is based on the geospatial location of the user;

calculating a probability, based on the monitoring of the interaction of the user with the mobile device based on the geospatial location of the user; and based on the monitoring of the control of the another device, of an occurrence of an event related to the mobile device and the another device, the event being in a temporal future relative to the calculating of the probability; and performing an action on the another device on behalf of the user in accordance with the calculated probability of the occurrence of the event before the user arrives at a place of habitation, wherein the another device is located at the place of habitation.

34. The system of claim 33, wherein the another device is configured to transmit an interaction of the user therewith to the server to enable analysis thereof therethrough.

35. The system of claim 34, wherein the geospatial location of the user is date-stamped and time-stamped through one of the server and the mobile device.

36. The system of claim 33, wherein the processor of the server further configured to execute instructions for analyzing data associated with the monitoring of the interaction of the user with the mobile device and the monitoring of the control of the another device to generate a behavioral pattern data of the user; and calculating the probability of the occurrence of the event based on the behavioral pattern data generated.

37. The system of claim 33, wherein the processor of the server is further configured to execute instructions for adjusting data associated with the event based on periodic reception of the geospatial location of the user.

38. The system of claim 33, wherein the processor of the server is further configured to execute instructions for adjusting the calculated probability based on periodic monitoring of the interaction of the user and the mobile device.

39. The system of claim 33, wherein the processor of the server is further configured to execute instructions for receiving a geospatial motion of the user of the mobile device.

40. The system of claim 33, wherein the another device is not a mobile device.

41. The system of claim 33, wherein the action is an environmental control action.

42. The system of claim 33, wherein the action is a state change action.

43. The system of claim 33, wherein the action is completing a task.

44. The system of claim 33, wherein the action is a device power setting, a power activation procedure, a power discharge procedure, a schedule notification, an alert notification, an arrival notification, a departure notification, a state adjustment, or a motion adjustment.

45. The system of claim 33, wherein the another device is a lighting device, a projector device, or a computing device.

46. The system of claim 33, wherein the place of habitation is a place of residence, an office, a gymnasium, a conference room, or a car.

47. The system of claim 33, wherein the place of habitation is not a place of residence.

48. The system of claim 33, wherein the performing of the action on the another device on behalf of the user in accordance with the calculated probability of the occurrence of the event is at least 10 minutes before the user arrives at the place of habitation.

* * * * *

UNITED STATES PATENT AND TRADEMARK OFFICE
CERTIFICATE OF CORRECTION

PATENT NO. : 10,257,643 B2  
APPLICATION NO. : 13/584854  
DATED : April 9, 2019  
INVENTOR(S) : Vinod Khosla Page 1 of 1

It is certified that error appears in the above-identified patent and that said Letters Patent is hereby corrected as shown below:

In the Claims

At Column 10, Claim 36, Line 53, please replace: "server further" with --server is further--.

Signed and Sealed this  
Twenty-ninth Day of October, 2019

Andrei Iancu  
*Director of the United States Patent and Trademark Office*